(12) United States Patent
Heinrich et al.

(10) Patent No.: US 9,870,233 B2
(45) Date of Patent: Jan. 16, 2018

(54) INITIALIZING A MEMORY SUBSYSTEM OF A MANAGEMENT CONTROLLER

(75) Inventors: David F. Heinrich, Tomball, TX (US); Theodore F. Emerson, Tomball, TX (US); Hung Q. Le, Katy, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 549 days.

(21) Appl. No.: 13/697,972

(22) PCT Filed: May 28, 2010

(86) PCT No.: PCT/US2010/036691
§ 371 (c)(1),
(2), (4) Date: Nov. 14, 2012

(87) PCT Pub. No.: WO2011/149481
PCT Pub. Date: Dec. 1, 2011

(65) Prior Publication Data
US 2013/0067189 A1     Mar. 14, 2013

(51) Int. Cl.
*G06F 9/44*     (2006.01)
*G06F 11/14*     (2006.01)
*G06F 11/30*     (2006.01)

(52) U.S. Cl.
CPC ........ *G06F 9/4411* (2013.01); *G06F 11/1417* (2013.01); *G06F 11/3037* (2013.01); *G06F 11/3051* (2013.01)

(58) Field of Classification Search
CPC .... G06F 12/00; G06F 9/4411; G06F 11/1417; G06F 11/3037; G06F 11/3051; G11C 29/04
(Continued)

(56) References Cited

U.S. PATENT DOCUMENTS

| 5,659,748 A | * 8/1997 | Kennedy | ............... G06F 9/4405 713/2 |
| 7,155,579 B1 | 12/2006 | Neils | |

(Continued)

FOREIGN PATENT DOCUMENTS

| CN | 1797376 | 7/2006 |
| KR | 20060046164 | 5/2006 |
| WO | WO-2004097642 | 11/2004 |

OTHER PUBLICATIONS

International Searching Authority, The International Search Report and the Written Opinion, dated Feb. 25, 2011, 8 Pages.
(Continued)

*Primary Examiner* — Terrell Johnson
(74) *Attorney, Agent, or Firm* — Fabian VanCott

(57) ABSTRACT

A method for initializing a memory subsystem (212) of a management controller (200) includes, with an additional memory initialization module (206) of the management controller (200), initializing the memory subsystem (212) of the management controller (200) in response to the memory subsystem (212) not being properly initialized. A management controller (200) includes a memory subsystem (212) including a memory controller (214) and a memory (216); firmware (208) able to initialize the memory subsystem (212); and a memory initialization module (206) to initialize the memory subsystem (212) if the memory subsystem (212) is not properly initialized.

20 Claims, 5 Drawing Sheets

(58) Field of Classification Search
USPC .......................................................... 713/1
See application file for complete search history.

(56) References Cited

U.S. PATENT DOCUMENTS

| | | | |
|---|---|---|---|
| 7,194,614 B2 | 3/2007 | Lee | |
| 7,293,165 B1 | 11/2007 | Tobias | |
| 7,600,110 B2 | 10/2009 | Fu | |
| 2004/0207440 A1* | 10/2004 | Robertson et al. | 327/291 |
| 2005/0193189 A1 | 9/2005 | Kim | |
| 2006/0005002 A1 | 1/2006 | Zimmer et al. | |
| 2007/0067599 A1* | 3/2007 | Neils | G11C 5/04 |
| | | | 711/170 |
| 2007/0220241 A1 | 9/2007 | Rothman et al. | |
| 2007/0234123 A1 | 10/2007 | Shih et al. | |
| 2008/0059784 A1* | 3/2008 | Fu | 713/2 |
| 2008/0094413 A1* | 4/2008 | Autor | G06F 11/0769 |
| | | | 345/629 |
| 2013/0067189 A1* | 3/2013 | Heinrich et al. | 711/170 |

OTHER PUBLICATIONS

Wikipedia, Graphics processing unit, Retrieved Feb. 27, 2014, 9 Pages.

* cited by examiner

INITIALIZING A MEMORY SUBSYSTEM OF A MANAGEMENT CONTROLLER

BACKGROUND

A management controller is a piece of hardware dedicated to the management of a host system's hardware. A host system may be a server system, a personal computer, or any other physical computing system. A physical computing system typically includes a motherboard which is the main circuit board used to house various components such as memory, processors, input/output controllers etc. The management controller can operate independently of these components to manage them. To operate independently, the management controller typically includes its own memory system and firmware. The firmware includes a number of instructions for operating the management controller. The firmware also includes the instructions for initializing the memory subsystem of the management controller. Initializing the memory subsystem refers to the process of getting the memory controller and memory ready for normal operation. The memory initialization process must be performed every time the management controller is powered on.

In some modern physical computing systems, a video controller for the host system is integrated with the management controller to save costs. A video controller is a piece of hardware dedicated to rendering graphics for display onto a display device such as a monitor. The video controller uses the same memory subsystem used by the management controller. Consequently, if the management controller memory is not properly initialized, the video controller will be unable to function.

When the management controller is powered on, it performs a boot process. This boot process includes, among other things, initializing the memory subsystem of the management processor. In some cases, hardware can be prone to failure. Thus, if for some reason, the management controller fails to boot properly or initialize the memory subsystem properly, then the management controller memory subsystem will not function. As the video controller relies on the management controller memory subsystem, the video controller will also not be able to function. The host system can operate without the standard functions of the management controller. However, the host system requires use of the video controller to provide human interaction.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
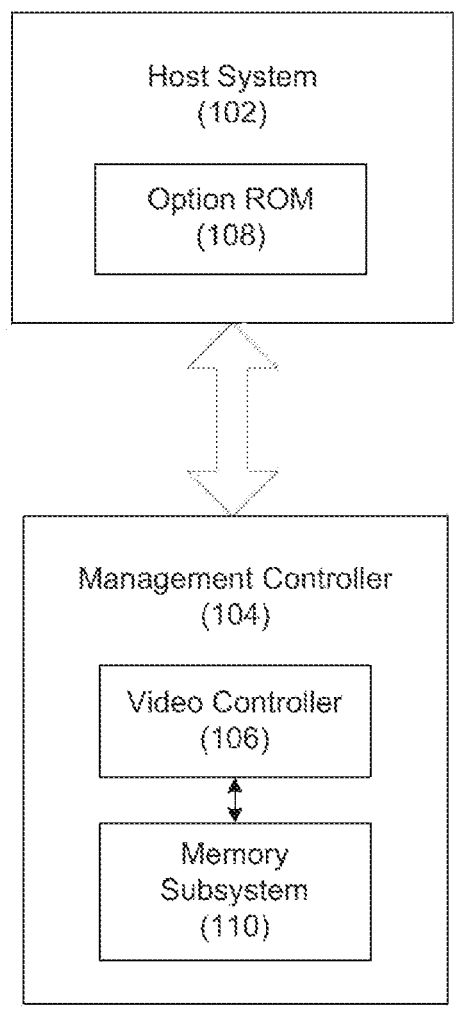
FIG. 1 is a diagram showing the relationship between the host system and a management controller, according to one example of principles described herein.

As mentioned above, when the management controller is powered on, it performs a boot process. This boot process includes, among other things, initializing the memory subsystem of the management processor. In some cases, hardware can be prone to failure. Thus, if for some reason, the management controller fails to boot properly or initialize the memory subsystem properly, the management controller memory subsystem will not function. As the video controller relies on the management controller memory subsystem, the video controller will also not be able to function. The host system can operate without the standard functions of the management controller. However, the host system requires use of the video controller to provide human interaction.

Some host systems include an option Read Only Memory (ROM). An option ROM is a piece of firmware which the Basic Input Output System (BIOS) of the host system can optionally use. The option ROM can initialize the memory subsystem within the management controller if the firmware of the management controller fails to initialize the memory subsystem. However, this process results in security issues because the host system is given access to the memory controller of the management controller memory subsystem.

In light of these and other issues, the present specification discloses a secure method for initializing the memory subsystem of a management controller in the event that the firmware of the management controller fails to initialize the memory subsystem. According to certain illustrative examples, the management controller includes an additional memory initialization module such as a hardware state machine designed specifically for initializing the memory subsystem. A hardware state machine is a piece of hardware designed to perform specific functions in response to specific conditions. More detail regarding the functionality of the hardware state machine will be given below.

A failsafe boot timer is used to determine if the firmware successfully initializes the memory subsystem of the management controller. If the memory subsystem is not successfully initialized by the management controller, then the failsafe boot timer can send a signal to the hardware state machine. This signal will prompt the hardware state machine to perform the memory subsystem initialization function.

Through use of a method or system embodying principles described herein, a management controller integrated with a video controller can still provide video controller functionality to a host system even if the firmware fails to boot up properly or initialize the memory subsystem of the management controller. Furthermore, the host system is not given access to the memory controller of the memory subsystem. This allows for a more secure system to be realized.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 is a diagram showing the relationship between the host system (102) and a management controller (104). According to certain illustrative examples, a management controller (104) is used to manage various hardware components of a host system (102). The management duties of the management controller (104) may include monitoring the power status, temperature, and cooling fan speeds of the host system (102). The management controller (104) can then report this information to an operating system of the host system (102).

As mentioned above, a video controller (106) is sometimes integrated with the management controller (104). In such implementations, the video controller (106) uses the same memory subsystem (110) which is used by the management controller (104). The memory subsystem (110) includes both a memory controller and the memory itself. This memory subsystem (110) is initialized when the management controller (104) is first powered on. In response to being powered on, the management controller (104) performs the task of initializing the memory subsystem (110). The process of initializing the memory subsystem (110) involves a number of steps which get the memory from its powered down state to a usable state. Details of the memory subsystem (110) initialization process will be given below.

Although the host system (102) can still operate without the functionality of the management controller (104), the host system cannot be fully operative without a functioning video controller (106). The video controller (106) will not function if the memory subsystem (110) of the management controller (104) is not properly initialized. Therefore, if the firmware responsible for initializing the memory subsystem (110) fails to work properly, then the video controller (106) will be unable to function. This is because the video controller (106) requires use of the initialized and fully operational memory subsystem (110).

As mentioned above, some host systems (102) include an option ROM (108) capable of initializing the memory subsystem of the management controller (104). An option ROM (108) is a piece of firmware designed to perform a variety of tasks. For example, the option ROM can initialize the video controller (106). The option ROM can also be made capable of initializing the memory subsystem (110) of the management controller (104). However, this is not desirable because it allows the host system (102) access to the memory controller for the memory of the management controller. This opens a security hole which can allow malicious software to compromise the security of the management controller (104).

Figure 2:
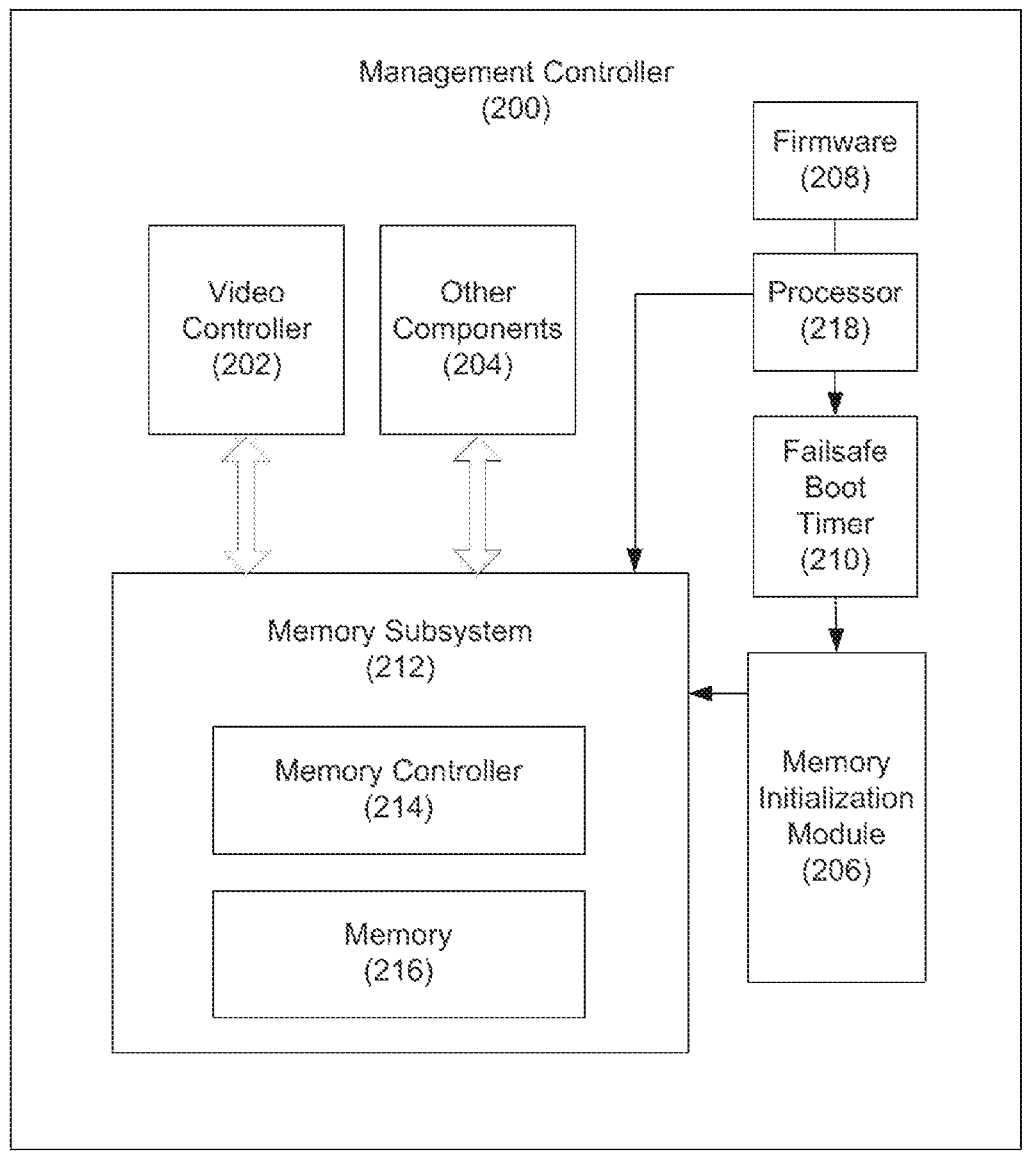
FIG. 2 is a diagram showing illustrative components of a management controller, according to one example of principles described herein.

FIG. 2 is a diagram showing illustrative components of a management controller. According to certain illustrative examples, a management controller includes a memory subsystem (212). The memory subsystem (212) includes a memory controller (214) and a memory (216). The memory subsystem (212) is typically initialized by a processor (218) executing instructions from a firmware (208) of the management controller (200). The memory subsystem (212) is used by a video controller (202) as well as other components (204) of the management controller (200). The management controller (200) also includes a memory initialization module (208) and a failsafe boot timer (210).

The memory (216) of the memory subsystem (212) is typically a volatile form of memory. Volatile memory loses its data when it is powered off. Volatile memory also loses its settings required to run properly when it is powered down. This is why the memory subsystem (212) must be initialized every time the management controller (200) is powered on.

The memory controller (214) is a digital circuit separate from the memory (218). The memory controller (214) is responsible for managing the flow of data between memory (216) and the components (204) which use that memory (216), including the video controller (202).

As mentioned above, a video controller (202) is a piece of hardware dedicated to rendering graphics for display onto a display device such as a monitor. During normal operation, the video controller (202) receives data and commands from the host system. The video controller (202) then interacts with the memory system of the management controller to render images for display onto a display device. The video controller simultaneously reads the contents of a frame buffer rendered into the memory (216) and creates an output suitable for display. The frame buffer is scanned several times a second to produce a stable image onto a display device. As the video controller (202) needs the memory subsystem (212) to operate, the video controller (202) cannot perform its functions until the memory subsystem (212) is properly initialized.

As mentioned above, firmware (208) on the management controller (200) is generally responsible for initializing the memory subsystem (212). Firmware (208) is a set of processor instructions programmed onto a non-volatile memory device such as flash memory. When the management controller (200) is first powered on, the firmware (208) instructs the processor (218) to perform a boot process to get the components of the management controller (200) ready for operation. This boot process includes the memory subsystem (212) initialization process.

For various reasons, hardware is sometimes prone to failure. In some cases, the firmware (208) and/or processor (218) may not perform the boot process properly, leaving the memory subsystem (212) uninitialized or in an unknown state. According to certain illustrative examples, a failsafe boot timer (210) is used to determine if the memory subsystem (212) was properly initialized. The failsafe boot timer (210) can wait for a predetermined period of time after the management controller (200) has been powered on to receive confirmation that the memory subsystem (212) was properly initialized. If the failsafe boot timer receives no such confirmation after the predetermined period of time, then the failsafe boot timer (210) sends a signal to the memory initialization module (206). The memory initialization module (206) can then perform the memory subsystem initialization process.

According to certain illustrative examples, the memory initialization module (206) is a hardware state machine dedicated to the process of initializing memory. A hardware state machine is a set of hardware designed to produce a specific output or sequence of outputs based on a particular input. During operation, the hardware state machine progresses through a number of "states." A state refers to the current configuration of the transistors and other digital components of the hardware state machine. The transition from one state to the next is brought about by specified conditions. The process of progressing through states can produce a sequence of outputs which can be designed to perform the memory initialization process. Thus the memory initialization module (206) interacts with the memory subsystem (212) to perform the memory subsystem (212) initialization process.

Figure 3:
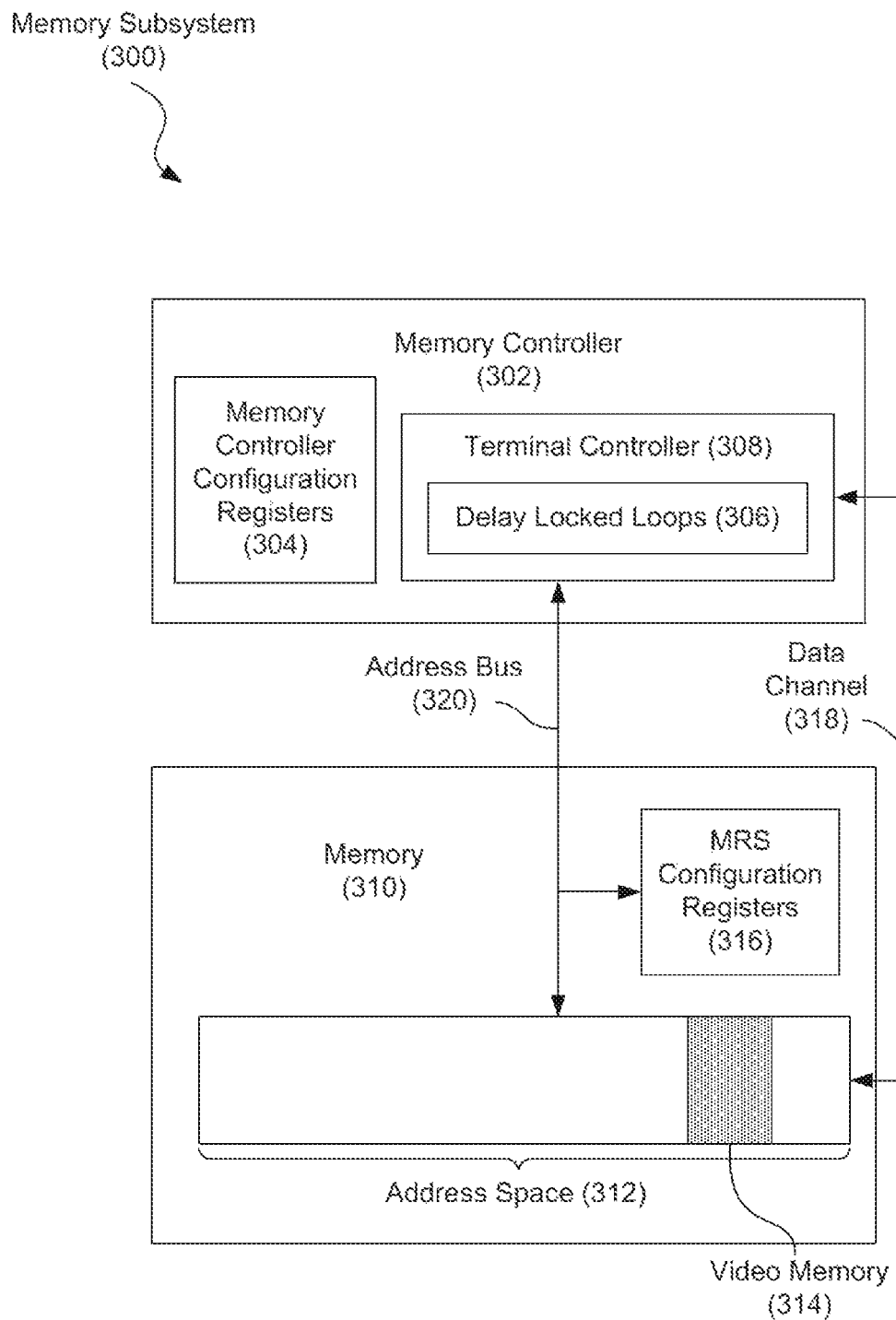
FIG. 3 is a diagram showing illustrative components of a memory subsystem, according to one example of principles described herein.

FIG. 3 is a diagram showing illustrative components of a memory subsystem (300). As mentioned above, the memory subsystem (300) includes a memory controller (302) and memory (310). The memory controller (302) is responsible for managing the flow of data between the memory (310) and other components of the management controller (e.g. 200, FIG. 2). According to certain illustrative embodiments, the memory controller (302) includes memory controller configuration registers (304) and a terminal controller (308) which includes Delay locked Loops (DLLs) (306).

The configuration registers (304) of the memory controller (302) are used to store information relating to the various characteristics of the memory (310). These characteristics include, but are not limited to, memory size, memory type, memory timing settings, memory mapping, and memory interface characteristics. In some cases, these settings can be provided by a hardware strap.

A terminal controller (308) is the physical interface between the memory controller and the memory (310). The physical interface includes the hardware required to send and receive electrical signals to and from the memory controller (302) and the memory (310). The terminal controller (308) includes DLLs (306). A DLL (306) is a digital circuit used to adjust the phase of a clock signal. As the memory (310) may run on a different clock signal than other devices which use that memory (310), a DLL (306) is used to synchronize the clock signals to allow efficient and accurate flow of data.

The memory (310) is typically a volatile form of memory. Volatile forms of memory generally operate at faster speeds than non-volatile forms of memory. Thus, volatile forms of memory are more suitable for applications in which a processor is reading and writing the data regularly. In one illustrative example, the management controller is a Dynamic Random Access Memory (DRAM). DRAM is a commonly used volatile form of memory. DRAM includes one transistor and one capacitive element per bit of storage. This is a small number of components compared to other forms of memory. Thus, DRAM generally has a higher density than other forms of memory. Examples of types of DRAM include, but are not limited to, Synchronous Dynamic Random Access Memory (SDRAM), Double Data Rate (DDR), DDR-2, and DDR-3.

DRAM memory typically includes a set of Mode Register Set (MRS) configuration registers (316). These configuration registers must be initialized prior to establishing a stable and reliable data channel (318) between the memory controller (302) and the memory (310). The data placed in the MRS configuration registers (316) is generally determined by the type of memory (310). For example, different types of DRAM have different but defined initialization sequences, referred to as MRS sequences. The commands of these sequences are issued using an address bus (318) between the memory controller and the memory (310). With the MRS configuration registers (316) programmed, a stable communication interface exists over the data channel (318) between the memory controller (302) and memory (310).

The memory (310) includes an address space (312). An address space (312) defines the range of discrete values which correspond to a number of memory elements. Each memory element stores one or more bits. The address space (312) can be partitioned, each partition being assigned for use by a specific device. For example, a portion of the address space (312) may be partitioned for use by the video controller (e.g. 202, FIG. 2). This partition may be referred to as video memory (314).

Figure 4:
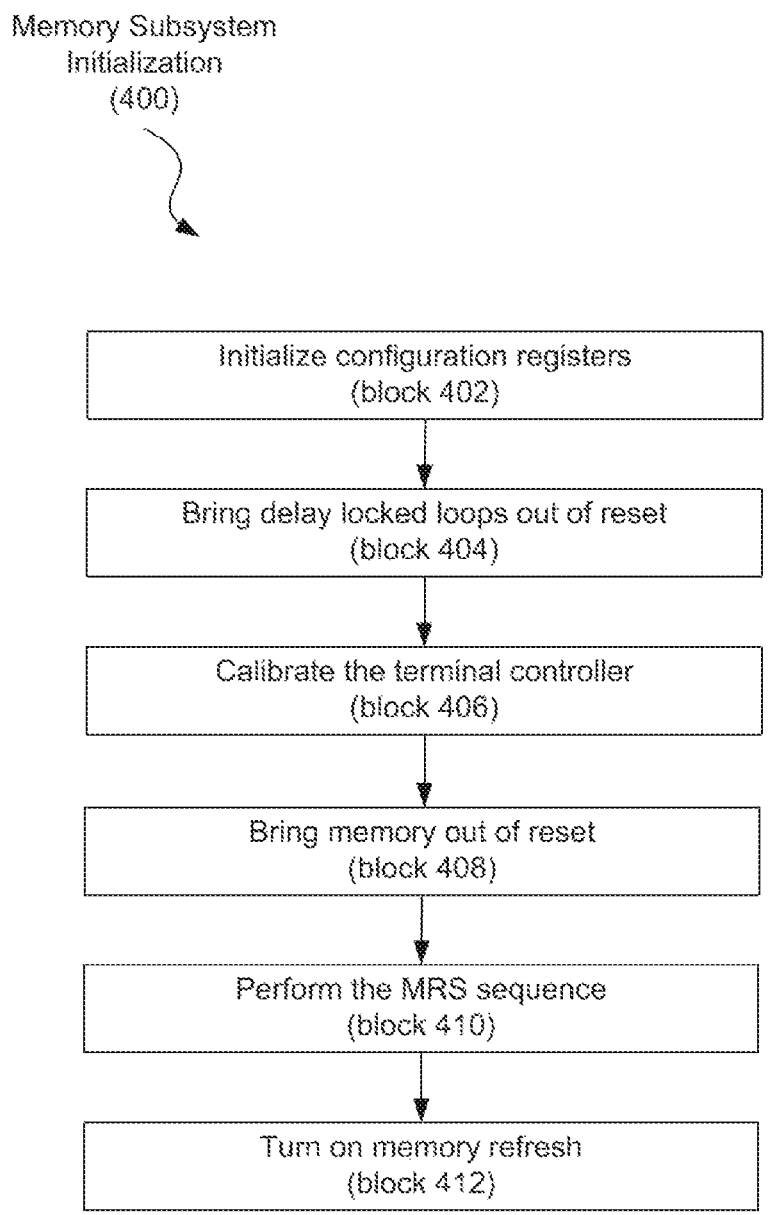
FIG. 4 is a flowchart showing an illustrative method for initializing a memory controller and memory, according to one example of principles described herein.

FIG. 4 is a flowchart showing an illustrative process (400) for initializing a memory subsystem (e.g. 300, FIG. 3). The memory subsystem initialization process includes performing operations on both the memory controller and the memory itself. The memory subsystem initialization process gets the memory ready for use when it is first powered on. The following describes some of the processes which can occur during a memory subsystem initialization process.

To initialize the memory subsystem, the memory controller configuration registers are initialized (block 402), the delay locked loops are brought (404) of reset, the terminal controller is calibrated (block 406), the memory is brought (block 408) out of reset, an MRS sequence is performed (block 410), and memory refresh is turned on (block 412). To perform these tasks and provide these components with the proper settings, the memory initialization module (e.g. 206, FIG. 2) can include of have access to a memory component which includes default settings for these memory subsystem components. For example, the memory initialization module may have access to a hardware strapping device. The hardware strapping device can provide the settings needed to property initialize the memory subsystem.

The memory controller configuration registers (e.g. 304, FIG. 3) are a volatile form of storage. Thus, they lose their data when the management controller is powered off. When the management controller is powered back on, the configuration registers will need to be loaded. Loading generally refers to the process of transferring data from a non-volatile form of memory to a volatile form of memory. The data related to the management controller memory characteristics can then be loaded to the configuration registers. The configuration registers can receive the appropriate settings from the non-volatile memory device associated with the memory initialization module.

As mentioned above, DLLs are used to synchronize the clock signals between components to allow for accurate and efficient transfer of data. When powered off, the DLLs are in a reset state. When the management controller is powered on, the DLLs need to be brought out of that reset state in order to perform their functions. The DLLs can receive appropriate settings from the memory initialization module.

The terminal controller (e.g. 308, FIG. 3) is calibrated in order to provide accurate and efficient flow of data between the memory controller and the memory. For example, the length of the bus lines between the memory controller and the memory will affect how the data should be transmitted across the bus lines. As data is being transferred at high rates, the length of the bus line is important to timing the transmission of data. The terminal controller can receive the appropriate settings from the memory initialization module.

When the memory is powered down, each transistor and capacitor used to store one bit is in a reset state. When powered on, the transistors and capacitors need to be brought out of that reset state in order to be able to store data properly. An MRS sequence is then performed. This is a sequence defined by a set of MRS configuration registers (e.g. 316, FIG. 3). This sequence further prepares the memory subsystem for use.

In the case that the management controller memory (310) is a DRAM form of memory, the refresh function of that memory (310) is turned on as part of the memory subsystem initialization process. Because the data of DRAM memory is stored in a capacitive element, the data must be refreshed periodically. This is because the capacitive elements will only hold their data for a small period of time.

Depending on the type of DRAM memory, the memory subsystem initialization process may include the ZQ calibration process. The ZQ calibration process configures the output driver and the On Die Termination (ODT) for the DRAM memory. This calibration step can be used to control impedance matching of the output terminal of the DRAM memory, optimizing the flow of data to and from the DRAM memory.

Figure 5:
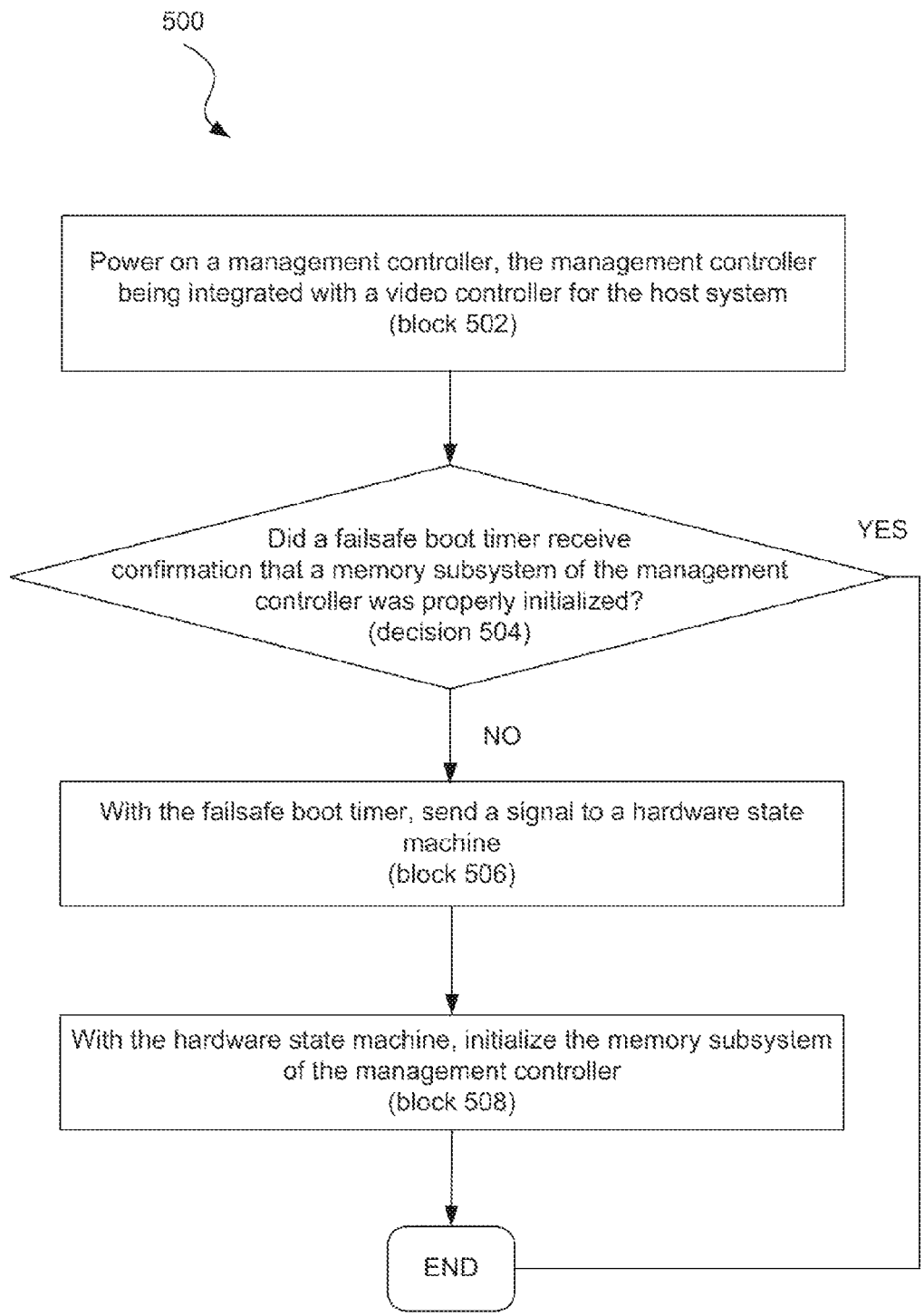
FIG. 5 is a flowchart showing illustrative method for using a memory initialization module to initialize memory, according to one example of principles described herein.

FIG. 5 is a flowchart showing illustrative method for initializing memory. According to certain illustrative examples, the method (500) includes powering on (block 502) a management controller, the management controller being integrated with a video controller for the host system. It is then determined (decision 504) if confirmation that the memory subsystem was properly initialized was received by the failsafe boot timer. If the confirmation was indeed (decision 504, YES) received, then the method ends.

If the confirmation was not (decision 504, NO) received, then the method continues with the failsafe boot timer of the management controller, sending (block 506) a signal to a hardware state machine; and with the hardware state machine, initializing (block 508) the memory subsystem of the management controller.

In sum, through use of a method or system embodying principles described herein, a management controller integrated with a video controller can still provide video controller functionality to a host system even if the firmware fails to boot up properly or initialize the management controller memory. Furthermore, the host system does not need to have access to the memory controller. This allows for a more secure system to be realized.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for initializing a memory subsystem of a management controller, the method comprising:
   executing, by a processor of the management controller, firmware storing instructions to initialize the memory subsystem;
   detecting that the processor executing the firmware has not initialized the memory subsystem; and
   initializing the memory subsystem with a memory initialization module of the management controller separate from the processor, in response to the detecting that the memory subsystem is not initialized by the processor executing the firmware.

2. The method of claim 1, wherein the management controller comprises a video controller for a host system, the video controller to utilize the memory subsystem.

3. The method of claim 1, wherein the detecting that the processor executing the firmware has not initialized the memory subsystem comprises detecting via a failsafe boot timer of the management controller that the memory subsystem is not initialized.

4. The method of claim 1, wherein the memory initialization module comprises a hardware state machine dedicated to initializing the memory subsystem.

5. The method of claim 1, wherein the initializing the memory subsystem comprises initializing configuration registers of a memory controller of the memory subsystem.

6. The method of claim 1, wherein the initializing the memory subsystem comprises calibrating a terminal controller of a memory controller of the memory subsystem and bringing delay locked loops of the memory controller out of a reset.

7. The method of claim 1, wherein the initializing the memory subsystem comprises bringing a memory of the memory subsystem out of a reset and performing a mode register set sequence.

8. The method of claim 1, wherein the initializing the memory subsystem comprises turning on a memory refresh.

9. A management controller comprising:
   a memory subsystem within the management controller comprising a memory controller and a memory;
   firmware to, when executed by a processor of the management controller, attempt to initialize the memory subsystem; and
   a memory initialization module, executed through a separate execution path with respect to the firmware and the processor, to initialize the memory subsystem when the processor fails to execute the firmware to initialize the memory subsystem.

10. The management controller of claim 9, further comprising a failsafe boot timer to detect that the memory subsystem is not initialized via the firmware.

11. The management controller of claim 9, wherein the memory initialization module comprises a hardware state machine dedicated to initializing the memory subsystem.

12. The management controller of claim 9, wherein to initialize the memory subsystem, the memory initialization module is further to initialize configuration registers of the memory controller and the memory.

13. The management controller of claim 9, wherein to initialize the memory subsystem, the memory initialization module is further to calibrate a terminal controller of the memory controller and to bring delay locked loops of the terminal controller out of a reset.

14. The management controller of claim 9, wherein to initialize the memory subsystem, the memory initialization module is further to bring the memory out of a reset and to perform a mode register set sequence.

15. The management controller of claim 9, wherein to initialize the memory subsystem, the memory initialization module is further to turn on a memory refresh.

16. A method for initializing a memory subsystem of a management controller, the method comprising:
   with a failsafe boot timer of the management controller, determining that a firmware of the management controller failed to initialize the memory subsystem of the management controller, the management controller comprising a video controller for a host system, the video controller to utilize the memory subsystem;
   with the failsafe boot timer, sending a signal to a memory initialization module in response to the firmware failing to initialize the memory subsystem; and
   with the memory initialization module, initializing the memory subsystem of the management controller.

17. The method of claim 16, wherein the initializing the memory subsystem comprises initializing configuration registers of a memory controller of the memory subsystem.

18. The method of claim 16, wherein the initializing the memory subsystem comprises calibrating a terminal controller of a memory controller of the memory subsystem and bringing delay locked loops of the terminal controller out of a reset.

19. The method of claim 16, wherein the initializing the memory subsystem comprises bringing a memory of the memory subsystem out of a reset and performing a mode register set sequence.

20. The method of claim 16, wherein the initializing the memory subsystem comprises turning on a memory refresh.

\* \* \* \* \*